June 16, 1942.
A. C. PETRY
2,286,568
INSECT DESTROYER
Filed April 3, 1941
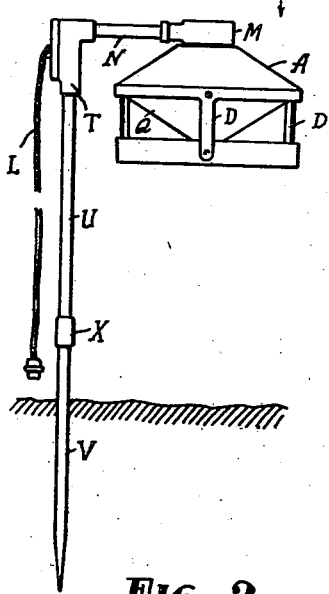
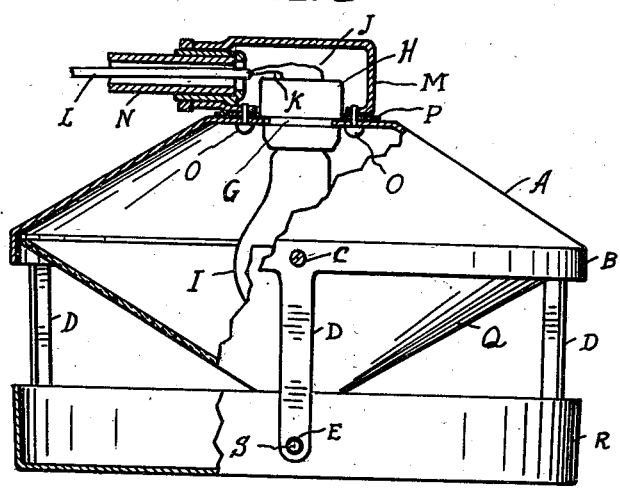
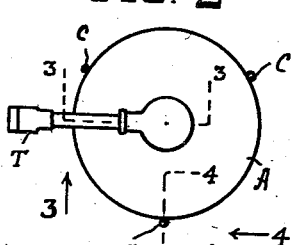
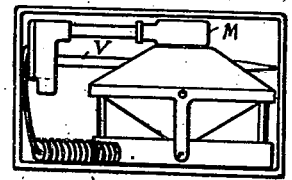
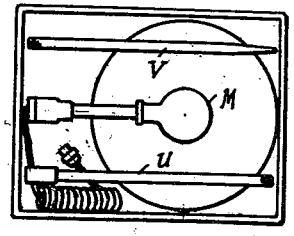
INVENTOR.
ALBERT C. PETRY
BY Thomas D. Ryan
ATTORNEY.

Patented June 16, 1942

2,286,568

UNITED STATES PATENT OFFICE 2,286,568

INSECT DESTROYER

Albert C. Petry, Anderson, Ind.

Application April 3, 1941, Serial No. 386,570

5 Claims. (Cl. 43—113)

This invention relates to improvements in insect-destroyer devices intended for use in resisting the scourge of insects injurious to plant life. It has to do especially with the providing of a device or apparatus of this kind intended for use in gardens and orchards, greenhouses and horticultural establishments generally.

My new insect destroyer apparatus is of that type in which is the general combination of a liquid retaining receptacle, a canopy therefor, and a lure mounted above the receptacle. The object of my invention is to construct an apparatus of this kind wherein is used an electric lamp, and to provide a combination and arrangement of parts, and features of construction whereby the apparatus as an entirety is practicable and economical of manufacture, merchandising, and use, and which is fully effective for the purposes for which it is intended.

The objects of my invention are accomplished by, and the invention is embodied in the new construction, combination and arrangement of parts described herein, and illustrated in the accompanying drawing.

The several parts of the invention are identified in the different views by suitable characters of reference.

Figure 1 is an elevational view of my improved insect destroyer as it appears in installed position and in readiness for use.

Figure 2 is a top plan view, as seen in the direction of arrow 2 in Figure 1.

Figure 3 is an enlarged vertical sectional view taken on the broken line 3—3, in the direction of arrow 3 in Figure 2.

Figure 4 is an enlarged vertical sectional view taken on the broken line 4—4, in the direction of arrow 4 in Figure 2.

Figure 5 is a side view, and Figure 6 is a top plan view, respectively, showing the appearance of the apparatus in knocked down status and as contained in a packing case for merchandising.

In the typical embodiment of my invention as same is illustrated herein, A designates a canopy made of sheet metal of suitable gauge and which embodies an annular vertical flange B. Retained in this flange are inwardly directed set screws C, in the present instance, three, equally spaced. Integrated with the said flange B are downwardly directed holder bars D, in the present instance, three, equally spaced. Each of these holder bars, made of resilient metal, is of predetermined length; each is directed slightly inwardly and is provided with an aperture E near its lower end portion and which latter is curved slightly outwardly, as plainly shown in Figure 4.

The top portion of said canopy is of flat formation and it is provided with a central opening G at which is secured a conventional electric two-piece repectacle H in which is received and retained a lamp I. Wires J and K of the conductor cord L are connected to the usual binding screws (not shown) of said receptacle. The conductor cord which may be of any desired length, in the present instance, about sixteen feet being suggested, is passed through a conventional weatherproof outlet box M and the conduit N to which reference will presently be made. By cap screws O and O the canopy is firmly secured to said outlet box, there being interposed an annular gasket P made of rubber or other suitable impervious material. A coating of white enamel on the interior of the canopy serves to intensify and to reflect downwardly the light afforded by the lamp.

To close the mouth of said canopy and to constitute a slanted shade and deflector I provide an inverted shallow cone shaped translucent shade Q made of glass, porcelain, or the like having a slant of about thirty degrees from the plane of its rim. This shade is disposed with its rim portion within the flange B of the said canopy, whereupon by tightening the screws C, C and C it is made fast.

The pan or basin is provided at the exterior surface of its wall R, with studs S, S and S which are spaced to register in alignment with the apertures E, E, and E of the holder bars which project downwardly from the flange of said canopy.

When the said holder bars become interengaged with the wall of the basin and their apertures E are brought to engagement with the studs S, the said holder bars click inwardly and serve to retain the basin in position properly spaced with relation to said canopy. The said holder bars are of such length that the basin is stayed in position so that the plane of its top edge is above the plane of the bottom point or edge of said shade, as plainly shown in Figure 4. By the above arrangement there is provided a relatively intense glow of light of definite area in the zone immediately above and close to the basin.

In the present embodiment, and which I designate as the supported type, there extends from the outlet box M the conduit arm N which is fitted with the elbow T and through which the conductor cord L is passed. A post of divided formation consists of sections U and V connected together with coupling X; section U being screwed into the elbow T, and section V having its free end of tapered formation as shown in Figure 1. The reason for making this post of divided formation as shown, will presently be referred to.

My improved trap and destroyer is useful by day, or by night. It is especially effective during nocturnal hours and when insect life is most active.

Keeping in mind the importance of so constructing this invention that it may be capable of being handled conveniently and economically, it has been designed throughout so as to be supplied to the customer, practically in readiness for use; the lamp being in operative position and the conductor cord being connected and supplied with an attachment plug. Each section of the support post is of length suitable to be received and packed in a shipping carton or package of conventional formation to contain the trap structure proper. The outfit constructed in accordance with the foregoing description, when deposited in the shipping case, appears as indicated in Figures 5 and 6. In instances wherein the support post is not used and the device rests upon an object such as a bench or the like, the holder bars D then function as elements to support the canopy. At such times as the trap construction is contained in the shipping case, the said holder members act as stays preventing any possibility of displacement or breakage of the shade; at the same time there is suitable space for the placing of packing material in which to nest the post sections U and V as indicated in Figure 6.

Setting up the invention in readiness for use consists of removing same from the packing case; coupling the post sections U and V, and securing section U to the elbow fitting T, and then inserting the post into the ground at desired depth. The basin is then filled to about two thirds its depth with water and to which is added a film of kerosene or other liquid which is fatal to insects. The conductor cord, by its conventional attachment plug, is then connected to the source of electric current, either directly, or by an extension cord if same may be necessary, depending upon the location where the device is to be used.

The insect, entering the zone underneath and striking directly against the surface of the lowly inclined shade and being caught between the glare of the shade, and the reflected glare of the liquid, is rendered incapable of any movement other than of diving or falling directly into the liquid, from which there is no escape. To detach the basin, one or more of the holder bars is pressed outwardly and apart from the studs, when the basin is moved aside, the remaining stud or studs becoming detached from the remaining holder bar or bars. Access to the lamp for any purpose, such as for renewal or replacement is easily had by retracting the set screws C and removing the shade. Whereas the lamp and the interior of the canopy and shade are protected and shielded from the elements it is found that there is sufficient circulation of air through the space surrounding the rim of the shade to prevent abnormal temperature within the said canopy. At the same time such entry of foreign particles into the interior of the canopy as there may be is so slight that the device may be used over a long period of time without any need of cleaning same.

Whereas I have set forth what I consider as a preferred form of embodiment of my invention, it will be understood that minor changes and modifications may be made, and the invention may be typified in various forms, without departing from the spirit and principles of the invention as it is defined in the appended claims.

What I claim as my invention, is:

1. A device of the kind described, comprising a basin, a canopy therefor, an electric receptacle embodied in said canopy at its peak a lamp secured in said receptacle, an inverted shallow cone shaped shade removably attached at its rim immediately at the interior of the rim of and closing the canopy, and spaced upright connector members to detachably hold the canopy and the basin in such spaced relation that the plane of the top of the basin is above the plane of the point of said shade.

2. Apparatus of the kind described comprising a basin, a canopy therefor, a lamp retained within the canopy, a smooth, clear shade structure immediately at and closing said canopy and the surface of which said shade structure is inclined downwardly at an angle of approximately thirty degrees to the plane of the basin, and spaced upright connector bars to detachably hold the canopy and basin in such spaced relation that the plane of the top of the basin is above the plane of the lowermost portion of the said shade structure.

3. Apparatus of the kind described, comprising a cone shaped sheet metal canopy having an annular vertical bottom flange, spaced inwardly directed set screws in said flange, spaced downwardly directed resilient holder bars integrated with said flange, each being directed slightly inwardly and being provided with an aperture near its lower end portion and which latter is curved slightly outwardly, an electric receptacle in the top portion of said canopy, a lamp secured in said receptacle, an inverted shallow cone shaped translucent shade removably retained by the set screws of said canopy flange, and a basin provided with external studs spaced to register in alignment with the apertures of said holder bars.

4. An insect destroyer apparatus consisting of a cone shaped canopy provided with a central opening at its peak and with an annular vertical flange at its base, a two-piece electric receptacle secured at the said opening, and there being spaced inwardly directed setscrews provided in the said flange, an electric outlet box enclosing the top section of said receptacle and disposed on the peak portion of said canopy, an annular gasket between the outlet box and said canopy, means to secure the canopy, gasket and outlet box in united relation, a lamp retained by said receptacle, an inverted cone shaped translucent shade fastened at its rim by the said set screws, to the bottom flange of said canopy, spaced support bars carried by the said canopy, an insecticide basin detachably secured to said support bars, a conduit arm secured to said outlet box, an elbow fitting on said arm, and a post member detachably connected to said fitting and consisting of sections detachably coupled together.

5. In an insect destroyer device of the kind described, in combination with an insecticide basin, a canopy supported above said basin, and a lamp within the canopy, an inverted cone shaped shade having a flare of approximately thirty degrees retained below the lamp and at position whereby the peak of said shade is at a plane below the plane of the top of the said basin.

ALBERT C. PETRY.